(12) United States Patent
Johnson et al.

(10) Patent No.: US 12,165,649 B1
(45) Date of Patent: *Dec. 10, 2024

(54) SYSTEMS AND METHODS TO UTILIZE TEXT REPRESENTATIONS OF CONVERSATIONS

(71) Applicant: United Services Automobile Association ("USAA"), San Antonio, TX (US)

(72) Inventors: Zakery L. Johnson, Santa Clara, UT (US); Jonathan E. Neuse, Helotes, TX (US)

(73) Assignee: United Services Automobile Association ("USAA"), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,789

(22) Filed: May 10, 2023

Related U.S. Application Data

(63) Continuation of application No. 17/236,732, filed on Apr. 21, 2021, now Pat. No. 11,688,400, which is a
(Continued)

(51) Int. Cl.
*G10L 15/26* (2006.01)
*G06F 16/68* (2019.01)
(Continued)

(52) U.S. Cl.
CPC ............ *G10L 15/26* (2013.01); *G06F 16/686* (2019.01); *G06Q 30/016* (2013.01);
(Continued)

(58) Field of Classification Search
CPC ....... H04M 2203/40; H04M 2203/407; H04M 2203/552; G10L 15/26; G10L 15/1815;
(Continued)

(56) References Cited

U.S. PATENT DOCUMENTS

| 7,949,534 B2 * | 5/2011 | Davis | G10L 15/26 |
| | | | 704/270.1 |
| 10,147,427 B1 * | 12/2018 | Johnson | G06Q 30/016 |

(Continued)

*Primary Examiner* — Michael N Opsasnick
(74) *Attorney, Agent, or Firm* — Locke Lord LLP; Christopher J. Capelli

(57) ABSTRACT

A method for electronically utilizing content in a communication between a customer and a customer representative is provided. An audible conversation between a customer and a service representative is captured. At least a portion of the audible conversation is converted into computer searchable data. The computer searchable data is analyzed during the audible conversation to identify relevant meta tags previously stored in a data repository or generated during the audible conversation. Each meta tag is associated with the customer. Each meta tag provides a contextual item determined from at least a portion of one of a current or previous conversation with the customer. A meta tag determined to be relevant to the current conversation between the service representative and the customer is displayed in real time to the service representative currently conversing with the customer.

20 Claims, 4 Drawing Sheets

Related U.S. Application Data continuation of application No. 16/535,970, filed on Aug. 8, 2019, now Pat. No. 11,017,775, which is a continuation of application No. 16/164,379, filed on Oct. 18, 2018, now Pat. No. 10,418,035, which is a continuation of application No. 14/857,539, filed on Sep. 17, 2015, now Pat. No. 10,147,427.

(60) Provisional application No. 62/051,730, filed on Sep. 17, 2014.

(51) Int. Cl.
  *G06Q 30/016* (2023.01)
  *G10L 15/18* (2013.01)
  *G10L 25/54* (2013.01)
  *G10L 25/63* (2013.01)

(52) U.S. Cl.
  CPC .......... *G10L 15/1815* (2013.01); *G10L 25/54* (2013.01); *G10L 25/63* (2013.01)

(58) Field of Classification Search
  CPC ....... G10L 25/54; G10L 25/63; G06F 16/686; G06Q 30/016
  See application file for complete search history.

(56) References Cited

U.S. PATENT DOCUMENTS

| | | | | |
|---|---|---|---|---|
| 11,017,775 | B1* | 5/2021 | Johnson | G10L 25/54 |
| 11,688,400 | B1* | 6/2023 | Johnson | G06F 16/36 704/235 |
| 2003/0101054 | A1* | 5/2003 | Davis | G10L 15/26 704/235 |
| 2005/0216269 | A1* | 9/2005 | Scahill | H04M 3/5183 704/270.1 |
| 2009/0097634 | A1* | 4/2009 | Nambiar | H04M 3/5183 379/265.09 |
| 2009/0232284 | A1* | 9/2009 | Afifi | H04M 3/42221 704/235 |
| 2009/0271194 | A1* | 10/2009 | Davis | G10L 15/26 704/235 |
| 2010/0204989 | A1* | 8/2010 | Boes | G10L 15/285 704/235 |
| 2010/0251094 | A1* | 9/2010 | Holm | G06F 16/9535 715/230 |
| 2011/0033036 | A1* | 2/2011 | Edwards | G06Q 30/02 379/265.09 |
| 2011/0082695 | A1* | 4/2011 | Bengt | G10L 15/26 704/9 |
| 2011/0206198 | A1* | 8/2011 | Freedman | H04M 3/51 379/265.03 |
| 2012/0030149 | A1* | 2/2012 | Antebi | G06N 5/04 706/11 |
| 2013/0332161 | A1* | 12/2013 | Beach | H04L 67/1027 704/235 |
| 2013/0332162 | A1* | 12/2013 | Keen | G06F 16/00 704/235 |
| 2013/0336465 | A1* | 12/2013 | Dheap | H04M 3/5166 379/88.01 |
| 2014/0220526 | A1* | 8/2014 | Sylves | G06Q 10/06395 434/238 |

* cited by examiner

SYSTEMS AND METHODS TO UTILIZE TEXT REPRESENTATIONS OF CONVERSATIONS

CROSS REFERENCE TO RELATED APPLICATIONS

This application is a Continuation of U.S. patent application Ser. No. 17/236,732 filed Apr. 21, 2021, which is a Continuation of U.S. patent application Ser. No. 16/535,970 filed Aug. 8, 2019, which is a Continuation of U.S. patent application Ser. No. 16/164,379 filed Oct. 18, 2018, which is a Continuation of U.S. patent application Ser. No. 14/857,539 filed Sep. 17, 2015, which claims priority to U.S. Patent Application No. 62/051,730 file Sep. 17, 2014, which are incorporated herein by reference in its entirety.

FIELD OF THE INVENTION

The present disclosure relates generally to voice communication systems, and more particularly, to a system and method to utilize text representations of conversations.

BACKGROUND OF THE INVENTION

Call tracking technology systems are used to improve online and offline marketing. Such systems use underlying technologies which take a digital call recording and convert it into computer readable text strings. One method known in the art is large vocabulary continuous speech recognition (LVCSR). LVCSR receives an input digital call and fully transcribes the call into text based on a full dictionary of the language in question.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for electronically utilizing content in a communication between a customer and a customer representative is provided. An audible conversation between a customer and a service representative is captured. At least a portion of the audible conversation is converted into computer searchable data. The computer searchable data is analyzed during the audible conversation to identify relevant meta tags previously stored in a data repository or generated during the audible conversation. Each meta tag is associated with the customer. Each meta tag provides a contextual item determined from at least a portion of one of a current or previous conversation with the customer. A meta tag determined to be relevant to the current conversation between the service representative and the customer is displayed in real time to the service representative.

In another aspect, a computer system for electronically utilizing content in a communication between a customer and a customer representative is provided includes one or more processors, one or more computer-readable storage devices, and a plurality of program instructions stored on at least one of the one or more storage devices for execution by at least one of the one or more processors. The plurality of program instructions includes program instructions to capture an audible conversation between a customer and a service representative. The plurality of program instructions further includes program instructions to convert at least a portion of the audible conversation into computer searchable data. The plurality of program instructions further includes program instructions to analyze the computer searchable data during the audible conversation to identify meta tags previously stored in a data repository or generated during the audible conversation. Each of the meta tags is associated with the customer. Each meta tag provides a contextual item determined from at least a portion of one of a current or previous conversation with the customer. The plurality of program instructions further includes program instructions to display in real time a meta tag determined to be relevant to the current conversation between the service representative and the customer.

BRIEF DESCRIPTION OF THE DRAWINGS

The accompanying appendices and/or drawings illustrate various non-limiting, examples, inventive aspects in accordance with the present disclosure.

DETAILED DESCRIPTION OF CERTAIN EMBODIMENTS

Figure 1:
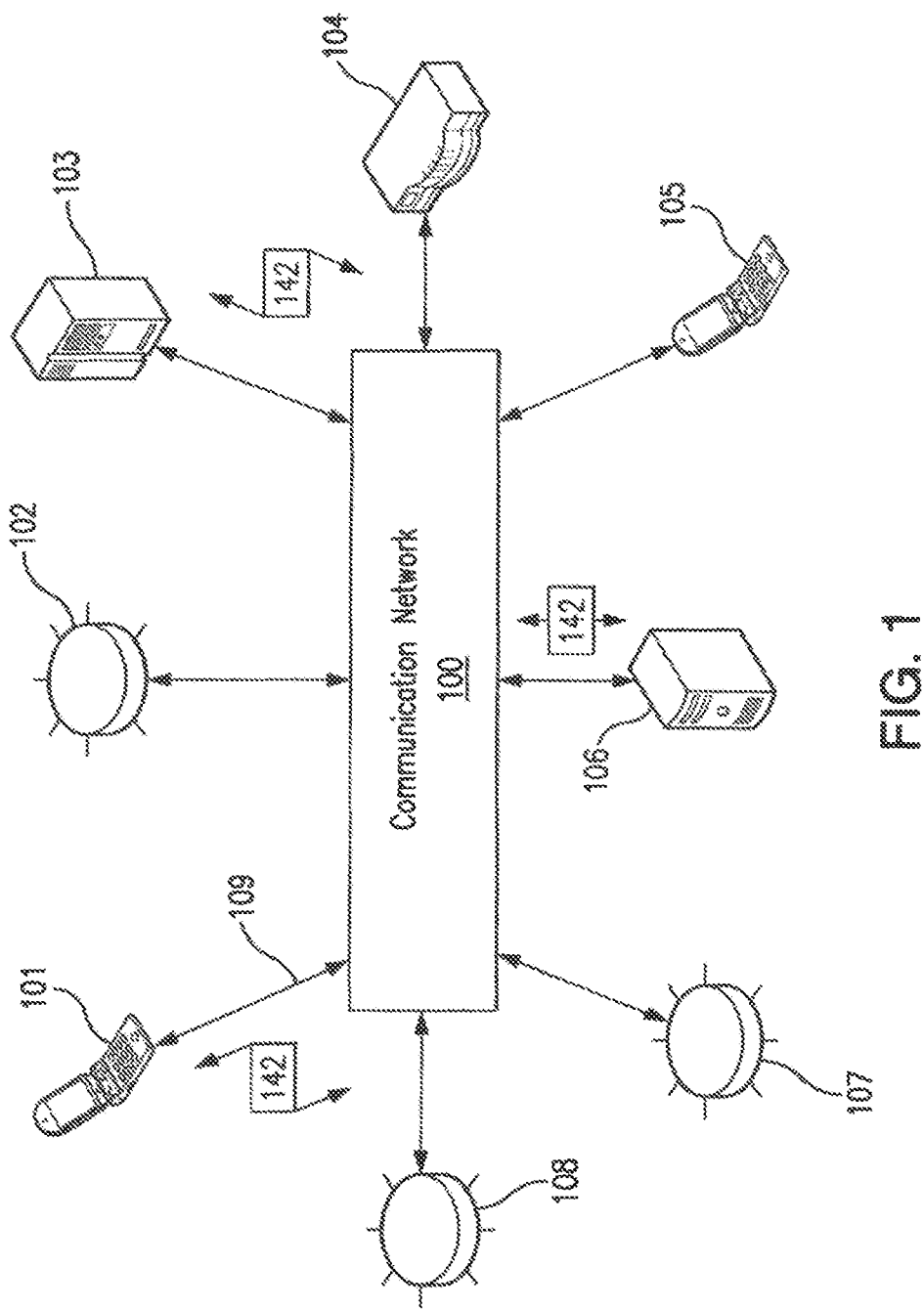
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

As used herein, the term "customer" refers to individuals such as established institution members or prospective members that interact with institution using a telecommunication device.

As used herein, the term "insurance" refers to a contract between an insurer, known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiment illustrated herein, the insurance policy is not to be understood to be limited to a residential or homeowners insurance policy, but can be for a commercial, umbrella, and other insurance policies known to those skilled in the art.

As used herein, the term "insurance policy" may encompass a warranty or other contract for the repair, service, or maintenance of insured property.

Embodiments of the present invention include a method, system, and computer program product that can be used in call centers and/or other environments where conversations take place between customers and service representatives employed by institution (merchant) to provide customer service. The system and method described herein electronically facilitate the analysis and augmentation of conversations taking place between customers and one or more service representatives. In some embodiments, the output of existing software programs capable of converting captured audible conversations to the computer searchable data is utilized to improve institution's business processes and reduce duplication of information. Advantageously, the electronic system described herein enables capture of information that may not be relevant during original discussion but may become relevant during later conversations. In some embodiments, based on the analysis of captured information, the institution may provide one or more products to substantially address automatically determined customer's needs.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

An exemplary communication network 100 depicted in FIG. 1 illustratively comprises nodes/devices 101-108 (e.g., sensors 102, institution system 103, smart phone devices 101, 105, computing devices 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

Figure 2:
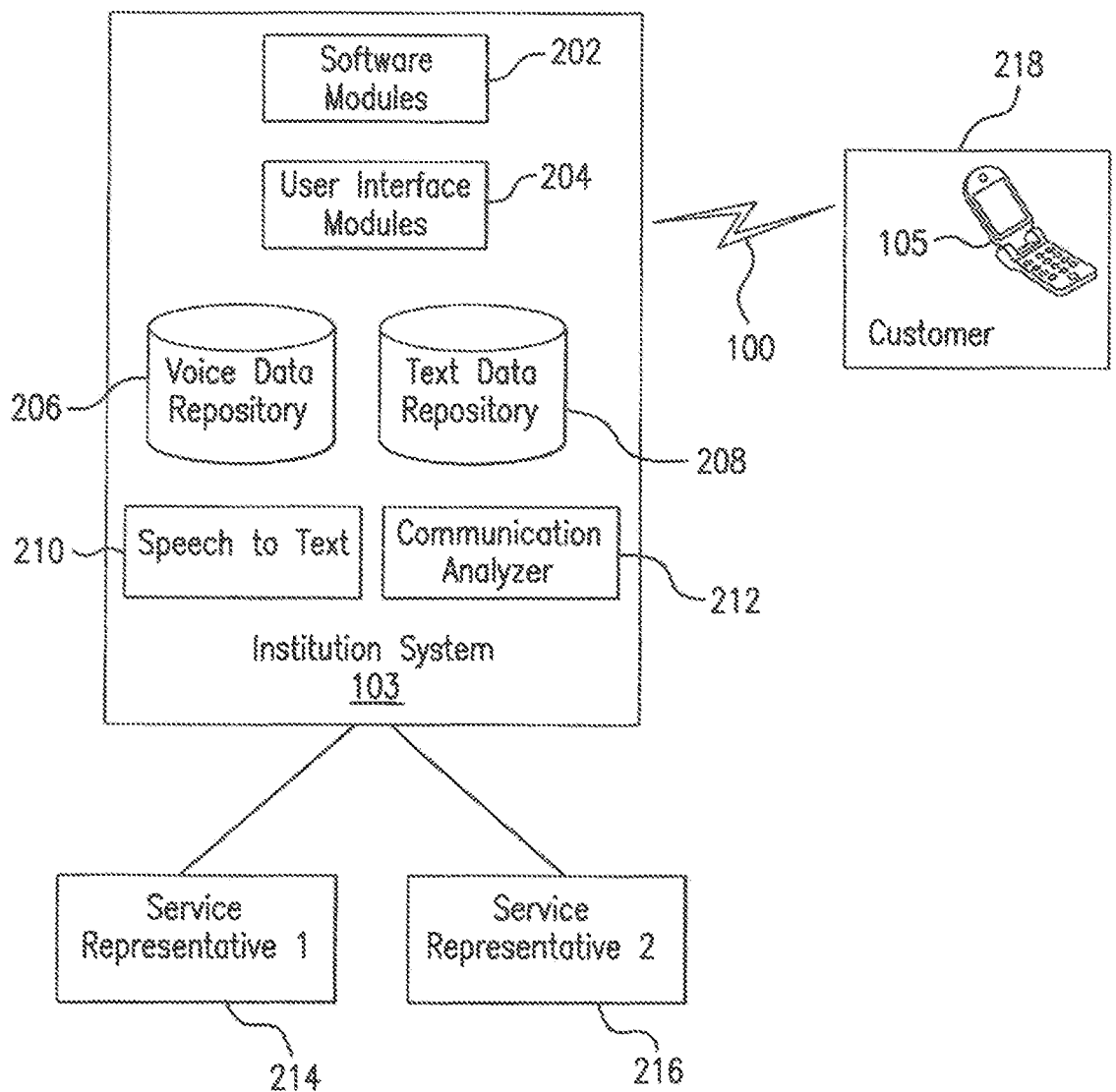
FIG. 2 is a block diagram of an exemplary system that may be used to facilitate an electronic utilization of conversation content in accordance with an exemplary embodiment of the present invention.

FIG. 2 is a block diagram of an exemplary system that may be used to facilitate an electronic utilization of conversation content in accordance with an exemplary embodiment of the present invention. FIG. 2 illustrates a variation of the telephone-computer network 100. The telephone-computer network 100 can be a Public Switched Telephone Network (PSTN), a Private Branch exchange (PBX), Electronic Private Automatic Branch exchange (EPABX), the internet, a WAN or LAN, for example carrying a VOIP call, a mobile network or combinations thereof. The telephone-computer network 100 includes an institution system 103, associated with or otherwise maintained by an institution such as a financial services institution, an insurance company, a merchant, etc., which includes a communication analyzer 212 that may be used for analyzing captured conversations between institution's customers 218 and service representatives 214, 216. Customer 218 may communicate with one or more service representatives 214,216 using, for example, a mobile device 105.

In one embodiment, a software program capable of converting captured audible conversations into computer searchable data may comprise a speech to text engine 210. This engine may be operatively interconnected with the communication analyzer 212 and may be configured to convert captured voice data into text data. Any suitable speech recognition software may be used as a speech to text engine 210 such as, but not limited to, Dragon™ available from Nuance Communications Inc., ViaVoice™ available from IBM, or Sphinx open source speech recognition available from CMU. In one specific embodiment, the speech engine used is off-the-shelf engine that is customized for this particular application. Output from the speech to text engine 210 is one or more individual text files representing corresponding voice communication.

According to some embodiments of the present invention, upon completion of the speech to text conversion process both voice and text data may be stored in one or more data repositories, such as voice data repository 206 and text data repository 208. Voice data repository 206 and text data repository 208 may each comprise a database. Furthermore, voice data repository 206 and text data repository 208 may each comprise a single storage device or a plurality of storage devices. Voice data repository 206 may be employed to store speech (voice) data (e.g., a plurality of captured conversations between institution's customers 218 and service representatives 214, 216). Text data repository 208 may be employed to store text data (e.g., the plurality of captured conversations between institution's customers 218 and service representatives 214, 216 converted to text using speech to text engine 210) along with corresponding meta tags as described below.

The communication analyzer 212 may dynamically use the information extracted from relevant past conversations in the context of a current conversation with the same customer. In one embodiment, the retrieved meta tags enable the communication analyzer 212 to analyze customer needs with a substantially high level of precision. As described below with reference to FIG. 3, the communication analyzer 212 may also analyze text and voice data representing previously captured conversations combined with captured data representing portions of current conversation to detect and measure customer's sentiment toward the determined needs or other contextual items. Such analysis enables service representatives 214, 216 to provide more relevant customer service advice and responses and to recommend one or more products adapted to address customer's needs.

In one embodiment, customer 218 may be connected to the institution system 103 via the user mobile device 105. Although in FIG. 2 the mobile device 105 is illustrated in the form of a mobile phone, in various embodiments of the present invention the mobile device 105 may be any phone or any handheld computing device. Examples of suitable phones include, but not limited to, landline phones, Voice Over IP (VOIP), satellite phones, and the like. Examples of suitable handheld devices include, but not limited to, smartphones, laptops, tablet computers, and the like. Although, only two service representatives 214, 216 are shown in FIG. 2, it is contemplated that any number of service representatives 214, 216 may be associated with the institution system 103.

In an embodiment of the present invention, a user interface module 204 may receive information (content) from the communication analyzer 212 and format one or more pages of content representing, for example, recommended services relevant to current discussion with the customer. This content may include meta tags and may be presented as a unified graphical presentation on a display device utilized by a service representative 214, 216.

In an embodiment of the present invention, the institution system 103 may be implemented as a web server having the user access system, through the use of any suitable interactive web technology. Such user access system may provide an interactive experience to the customer 218 through which access to additional information can be accomplished. Any technology that provides interactivity through a web browser is considered to be within the scope of the present invention and may include, without limitation, Hyper-Text Mark-up Language (HTML), Dynamic HTML (DHTML), JavaScript and Ajax.

In an embodiment, the institution may be a financial services institution (e.g., such as USAA, or any other entity providing financial, insurance and other services). As shown in FIG. 2, the institution system 103 may comprise one or more additional software modules 202. The software modules 202 may be used in the performance of the techniques and operations described herein and may be operatively coupled to the speech to text engine 210 and communication analyzer 212 modules. Example software modules may include, without limitations, modules for capturing voice conversation between the service representatives 214, 216 and the customer 218, requesting and retrieving voice and text data from data repositories 206, 208, and generating web pages described herein. While specific functionality is described herein as occurring with respect to specific modules, the functionality may likewise be performed by more, fewer, or other modules. The functionality may be distributed among more than one module. An example computing device and its components are described in more detail with respect to FIG. 4.

Figure 3:
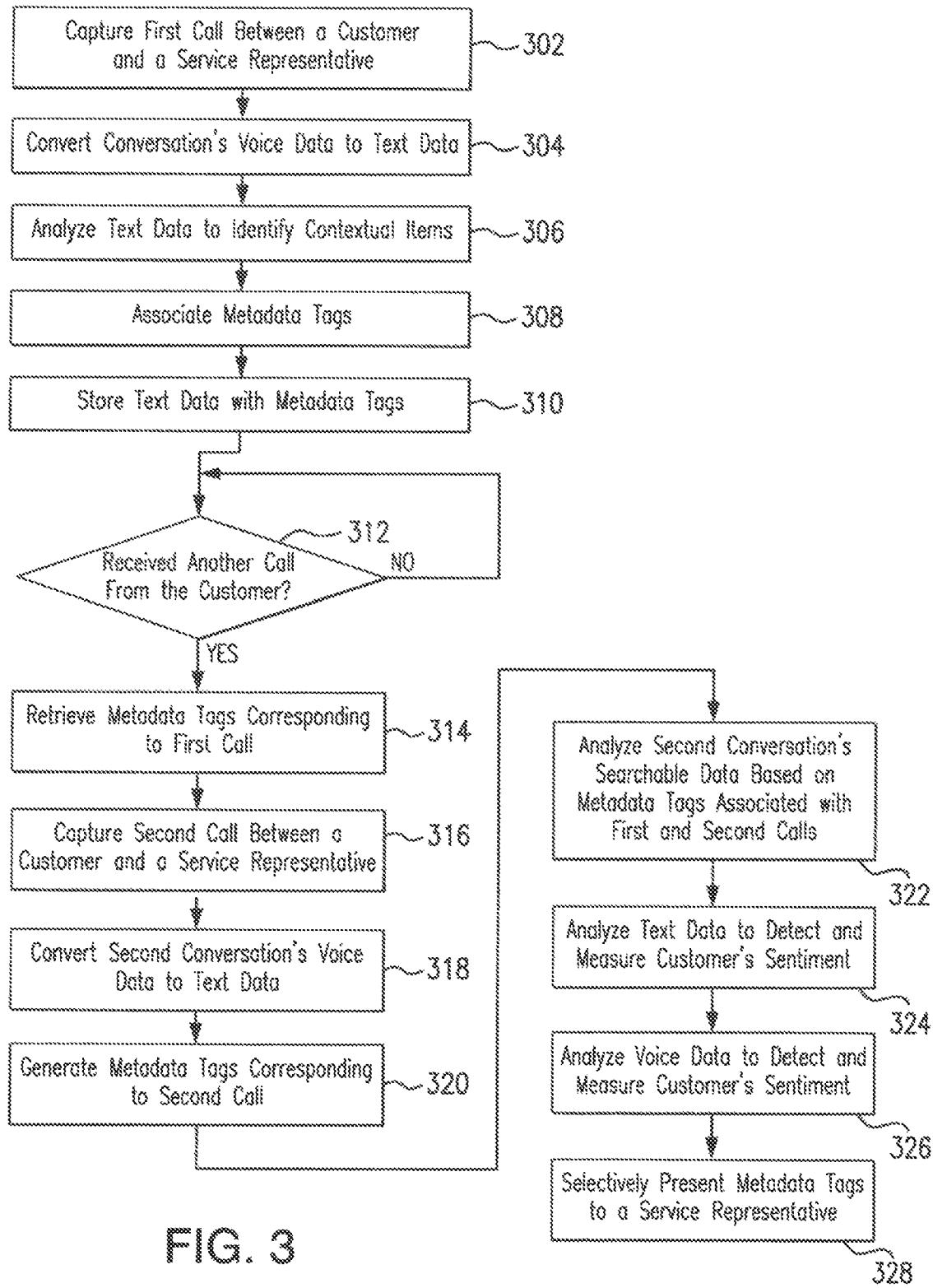
FIG. 3 is a flowchart of operational steps of the communication analyzer module of FIG. 2 in accordance with an exemplary embodiment of the present invention.

FIG. 3 is a flowchart of operational steps of the communication analyzer module 212 of FIG. 2 in accordance with exemplary embodiments of the present invention. Before turning to description of FIG. 3, it is noted that the flow diagram shown therein is described, by way of example, with reference to components shown in FIGS. 1-2, although these operational steps may be carried out in any system and are not limited to the scenario shown in the aforementioned figures. Additionally, the flow diagram in FIG. 3 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

In many industries, service representatives service a variety of requests from customers. For the sake of simplicity and clarity of explanation, the present disclosure will be described in the context of institution system 103 receiving inbound calls from the customers. It will be understood, however, that the various embodiments of this disclosure are not so limited by such environment and can be implemented in a variety of different customer support center conditions. As shown in FIG. 2, the call from telephone 105 can be placed over a telephone network, including, for example, mobile 100 and PSTN networks, to institution's phone bank. The phone bank may serve as the receiving point for the incoming calls. Incoming calls at the business (institution system 103) can be transferred to a service representative pool. According to one example, the method of transferring the calls can be selected by the institution. For example, incoming calls may be assigned in a rotating manner so as to assign each successive call to a different service representative. Alternatively, incoming calls can be assigned to specified service representatives based on the telephone number or advertising campaign that was called. Thus, for example, service representative 214 may receive at his or her telephone calls directed at advertising campaign A. Similarly, service representative 216 may be assigned calls directed at advertising campaign B. Alternatively, incoming calls may be directed at the next available service representative in a pool of service representatives.

Referring to FIG. 3, at 302, when incoming calls are received at an institution, they can be recorded by the communication analyzer module 212 according to an embodiment of the invention. For example, each recorded call can be associated with an identifier for the connected customer or for the service representative who fields the telephone call. Furthermore, the date and time that the call was received by the service representative, the length of the call, the calling number (which can be identified by a caller ID system), the name of the prospective or current customer (which can be determined by a reverse telephone number look-up utilizing the calling number or simply provided by the customer during the telephone conversation), the advertising campaign (which can be identified by the telephone number that was called and that was associated with a specific advertising campaign) can all be grouped as a set of data with the identifier for a particular customer. Furthermore, this set of data can also include a status code to indicate the current status of the call, as well as a text section for recording notes about the call or subsequent follow-up calls.

At 304, communication analyzer 212 may initiate connection with the speech to text module 210 in order to perform conversion of the audible conversation format (i.e., voice data) into computer searchable format (i.e., text data). In one embodiment, this conversion can be performed by the speech to text application 210 which can be one of a variety of speech to text applications such as Dragon™ of Via Voice™ previously mentioned. The speech to text application 210 can be running on the institution system 103 as shown in FIG. 2 or alternatively, can be run on an external programmable processor. It is noted that converted text data preferably represents transcript of the captured audible conversation. It is noted that the designated text output type can be any suitable type known in the art. Possible text output types include, but not limited to, ASCII, or application type format such as Microsoft Word, Microsoft Access database record, and the like.

At 306, communication analyzer 212 may analyze text data to identify one or more contextual items. "Contextual item" refers to information that is determined as being potentially relevant to the context of the communication session. In one embodiment, the communication analyzer 212 identifies, or receives from another module a plurality of contextual keys that is based on attributes associated with a communication session. A contextual key comprises a unit of data that may be used to identify one or more contextual items. A contextual key may comprise, for example, a word, a phrase, a date, a time, a name, or any other unit of data that may be used to identify a contextual item. The communication analyzer 212 uses the plurality of contextual keys to identify contextual items. In one embodiment, contextual items may represent various topics discussed during one or more communication sessions.

At 308, communication analyzer 212 may generate meta tags for captured content. In one embodiment, communication analyzer 212 may generate meta tags by associating one or more meta tags with each of the identified contextual items. As previously noted, meta tags which correspond to the identified contextual items may be depicted in the user interface 204 displayed on display devices used by service representatives 214, 216.

In one embodiment of the present invention, at 310, the transcript representing a communication between a customer and a service representative is stored in text data repository 208 along with corresponding metadata information, such as customer's calling number, name, generated meta tags and the like. In an embodiment of the present invention, the captured voice data representing a communication between a customer and a service representative may also be stored at 310, for example, in the voice data repository 206. Storing entire conversations in both voice and text data formats enables the institution system 103 to capture valuable information that may be substantially irrelevant at the time of original conversation but may become relevant at later conversations.

At 312, communication analyzer 212 may monitor institution's phone bank to determine whether any of the incoming calls are received from the customer 218 whose prior conversations with service representatives are stored in text data repository 208. It is noted that such calls can be transferred to a service representative pool according to the method of transferring calls selected by the institution. In one embodiment, incoming calls may be assigned in a rotating manner so as to assign each successive call to a different service representative. In another embodiment, incoming calls can be transferred to the service representative assigned to previous calls from the same customer.

Advantageously, communication analyzer 212 allows the service representatives to have a productive call with the customer by analyzing and recalling content of relevant past conversations in the context of an existing conversation. Since meta tags are effective in determining the accuracy of content similarity, either prior to or at the same time as connected customer is transferred to an assigned service representative, at 314, communication analyzer 212 may retrieve from the text data repository 208 meta tags associated with the connected customer and corresponding to all previous communications of the connected customer if such communication history exists.

It is noted that in a preferred embodiment, once the connected customer is transferred to an assigned service representative, communication analyzer 212 preferably starts to analyze content of their conversation in real time. Accordingly, at 316, communication analyzer 212 may start recording the conversation. Steps 318 and 320 shown in FIG. 3 are similar to steps 304-308 described above. In other words, upon capturing at least a portion of the conversation between the customer 218 and a service representative, at 320, communication analyzer 212 may generate meta tags associated with the identified contextual items for content found in the captured portion of the current conversation.

Advantageously, at 322, communication analyzer 212 employs contextually semantic information (which is reduced to meta tags) extracted from previous communication sessions of the customer 218 and combined with information extracted from captured portions of the current customer's 218 conversation to analyze the current conversation for relevancy of various contextual items. In one embodiment, this step may involve searching the transcript of one or more communication portions captured at 316 to identify at least one meta tag retrieved at 314 or generated at 320. In another embodiment, communication analyzer 212 may correlate these meta tags and may use correlation results to analyze subsequent portions of the captured contextual content. As a non-limiting example, at 322, communication analyzer 212 may identify customer's likely existing needs and/or anticipate future needs based on collected data related to all customer contacts and transactions, information related to purchasing and service history, product inquiries, complaints, customer's communication channel preferences, and response to marketing campaigns among many other contextual items. Accordingly, in one embodiment, by analyzing captured computer searchable data the communication analyzer 212 can automatically provide valuable insights on individual customer's needs and preferences at least some of each may not be readily apparent at the point of conversation. Furthermore, at 322, the communication analyzer 212 may determine whether any of the identified needs/preferences become relevant to a current conversation based on, at least in part, correlation of various meta tags.

In another aspect, communication analyzer 212 may optionally employ captured information to infer the customer's emotions and/or sentiment towards particular context items and/or to determine customer's satisfaction level. In one embodiment, transcripts of customers' communication sessions may serve as one of the sources for such inferences. Accordingly, in a preferred embodiment, at 324, the communication analyzer 212 may be configured to automatically detect and measure customer's sentiment by analyzing converted searchable data (such as text data) in real time. In various embodiments, the communication analyzer 212 may apply text mining and machine learning approaches to automatically measure customer's sentiment. Several suitable machine learning algorithms that may be employed by the communication analyzer 212 include, but not limited to the following four classification methods: decision tree, naive bayes, logistic regression and Support Vector Machine (SVM). In one embodiment, the communication analyzer 212 may search captured content to identify words showing the customer's emotion or attitude. To automatically identify words with sentiment polarity, the communication analyzer 212 may employ sentiment dictionary containing a list of sentiment-related words having a particular polarity. Once polarity has been determined, the number of positive sentiment words and the number of negative sentiment words spoken by the customer in relation to identified contextual items may be counted by the communication analyzer 212.

In those embodiments that store entire conversations in both voice and text data formats, the communication analyzer module 212, at 326, may employ audible data representing customer's prior and current conversations to infer the customer's emotions and/or sentiment towards particular context items. This analysis of customer's verbal behavior may optionally augment analysis performed at step 324. In one embodiment, the communication analyzer 212 may identify customer's emotional states at various points of captured conversations. This list of emotional states may include but is not limited to, nervousness, embarrassment, anger, confusion, interest, frustration and the like. For example, in order to identify customer's needs, the communication analyzer 212 may focus on verbal cues indicative of customer's interest. The term "interest" refers here to customer's emotional state related to the degree of engagement that customer displays. Segments of conversations where customers are highly engaged in a discussion are likely to indicate customer's interest towards particular context items being discussed in these segments. Interest levels can therefore define relevance level associated with particular context items. In various embodiments, the communication analyzer 212 may employ other audio cues such as customer's pitch, energy, speaking rate, etc. to derive customer's emotions and/or sentiment towards particular context items. In other embodiments, the communication analyzer is configured to measure the emotional progress of the customer, and/or a service representative, during the conversation. For instance, a customer's emotional status may progress from bad, to good, to better during the duration of the call. This may be accomplished by applying sentiment analysis to the text generated from the conversation and providing results of that analysis to the member in the form of a visual indicator of mood/emotion. It is to be appreciated that such accuracy will increase as the historical emotion context gathered from previous customer calls are collected and analyzed after calls. Additional embodiments may also be configured to provide offline analysis of customer sentiment or needs based on speech to text capture/recognition techniques. In a similar fashion, the performance of a customer service representative may also be conducted.

The iterative real time analysis of captured historical and current conversational portions performed at steps 322-326 enables the communication analyzer 212 to provide more accurate estimate of customer sentiment, intent and needs. Advantageously, based on the results of the analysis, at 328, the communication analyzer 212 may provide one or more meta tags determined to be relevant to a current conversation to the service representative 214, 216. At 328, the communication analyzer 212 may send the relevant meta tags to the user interface 204 which is preferably configured to display them on a device used by the service representative 214, 216. In some embodiments, the communication analyzer 212 may generate one or more recommendations intended to improve customer service experience, which may also be displayed to the service representative 214, 216 in real time via the user interface 204. For example, if the communication analyzer 212 infers a pattern of customer's dissatisfaction with particular product or service (identified by relevant meta tag) provided by the institution, the communication analyzer 212 may recommend offering the unsatisfied customer a particular discount, complimentary service or taking another compensatory measure. The provided recommendation should help the service representative 214, 216 to resolve the issue raised in the discussion. In an embodiment, results of the analysis performed by the communication analyzer 212 may be utilized to provide tailored product offerings. For example, if the communication analyzer 212 detects repeated customer interest in buying a new car, at 328, the communication analyzer 212 may suggest the service representative 214, 216 to offer a discount on a car insurance policy. It is noted that the plurality of possible recommendations from which the communication analyzer 212 may select one or more to display to the service representative 214, 216 may be defined by the application of business rules predefined by the institution.

The methodologies of embodiments of the invention may be particularly well-suited for use in an electronic device or alternative system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
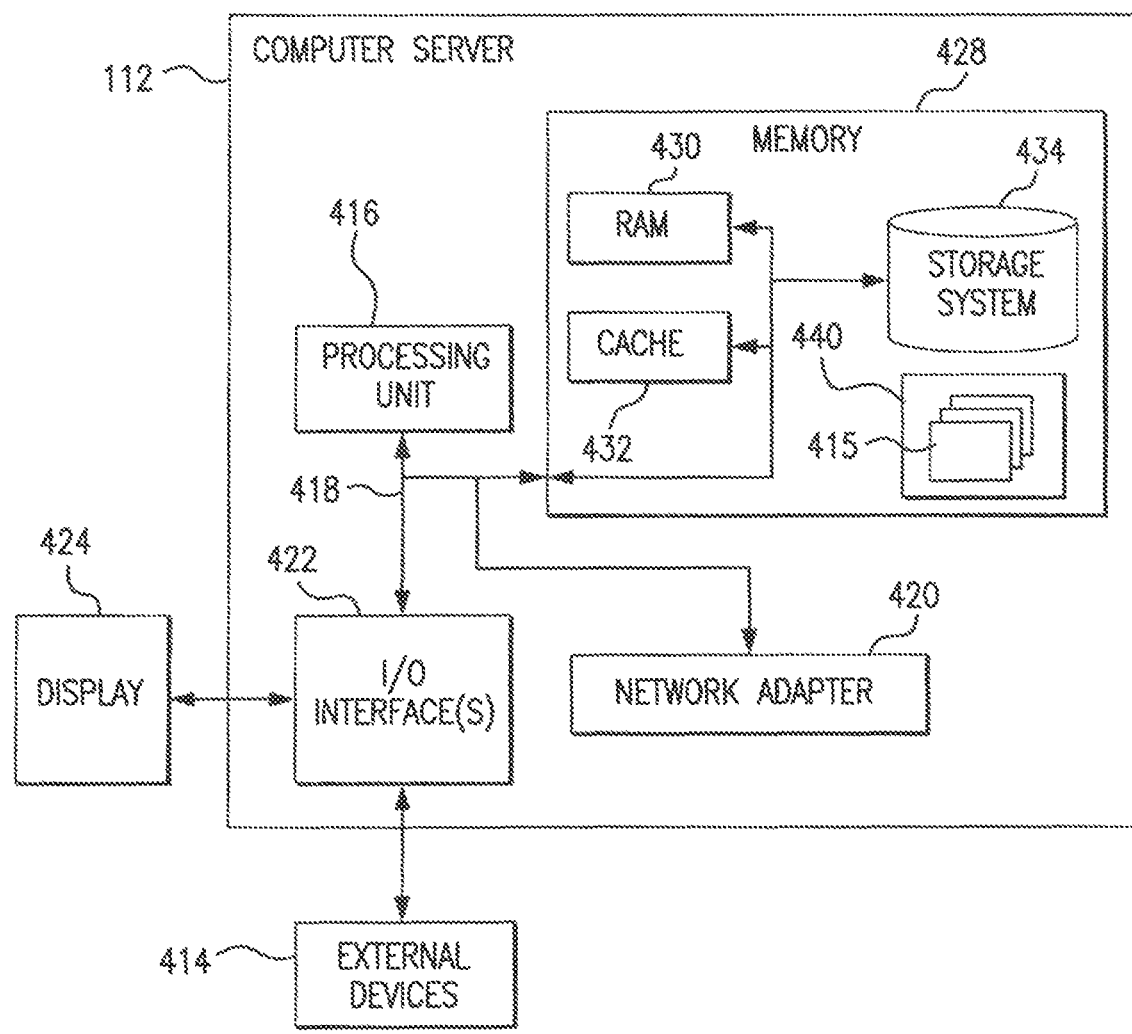
FIG. 4 illustrates a typical computing system that may be employed to implement some or all processing functionality in accordance with an exemplary embodiment of the present invention.

FIG. 4 is a schematic block diagram of an example network computing device 112 (e.g., institution system 103) that may be used (or components thereof) with one or more embodiments described herein, e.g., as one of the nodes shown in the network 100. Device 112 is intended to represent any type of computer system capable of carrying out the teachings of various embodiments of the present invention. Device 112 is only one example of a suitable system and is not intended to suggest any limitation as to the scope of use or functionality of embodiments of the invention described herein. Regardless, computing device 112 is capable of being implemented and/or performing any of the functionality set forth herein.

Computing device 112 is operational with numerous other general purpose or special purpose computing system environments or configurations. Examples of well-known computing systems, environments, and/or configurations that may be suitable for use with computing device 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 112 may be described in the general context of computer system-executable instructions, such as program modules, being executed by a computer system. Generally, program modules may include routines, programs, objects, components, logic, data structures, and so on that perform particular tasks or implement particular abstract data types. Computing device 112 may be practiced in distributed data processing environments where tasks are performed by remote processing devices that are linked through a communications network. In a distributed data processing environment, program modules may be located in both local and remote computer system storage media including memory storage devices.

Device 112 is shown in FIG. 4 in the form of a general-purpose computing device. The components of device 112 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 112 typically includes a variety of computer system readable media. Such media may be any available media that is accessible by device 112, and it includes both volatile and non-volatile media, removable and non-removable media.

System memory 428 can include computer system readable media in the form of volatile memory, such as random access memory (RAM) 430 and/or cache memory 432. Computing device 112 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 415, such as speech to text module 210 and communication analyzer 212 described above, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the invention as described herein.

Device 112 may also communicate with one or more external devices 414 such as a keyboard, a pointing device, a display 424, etc.; one or more devices that enable a user to interact with computing device 112; and/or any devices (e.g., network card, modem, etc.) that enable computing device 112 to communicate with one or more other computing devices. Such communication can occur via Input/Output (I/O) interfaces 422. Still yet, device 112 can communicate with one or more networks such as a local area network (LAN), a general wide area network (WAN), and/or a public network (e.g., the Internet) via network adapter 420. As depicted, network adapter 420 communicates with the other components of computing device 112 via bus 418. It should be understood that although not shown, other hardware and/or software components could be used in conjunction with device 112. Examples, include, but are not limited to: microcode, device drivers, redundant processing units, external disk drive arrays, RAID systems, tape drives, and data archival storage systems, etc.

FIG. 4 is intended to provide a brief, general description of an illustrative and/or suitable exemplary environment in which embodiments of the above described present invention may be implemented. FIG. 4 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method for electronically utilizing content in a current audible conversation between a first participant customer service representative of a company and a second participant company customer, the method comprising the steps of:
analyzing, by a computer processor, computer searchable text data, captured, converted and stored by the computer processor during the audible conversation to identify one or more contextual items determined from at least a portion of the current audible conversation between the first and second participants;
analyzing, by the computer processor, the one or more contextual items to determine one or more future product needs of the second participant also contingent upon analysis of prior stored audible conversations associated with the second participant;
determining one or more recommendations of product offerings tailored to the second participant based on the determined one or more future product needs of the second participant; and
generating one or more recommendations of product offerings tailored to the second participant based on the one or more meta tags, wherein the contextual item associated with the meta tag represents one or more topics discussed during one or more communication sessions and each contextual item includes one or more keys.

2. The method as recited in claim 1, further including identifying, by the processor, one or more meta tags previously determined relevant to a current conversation between the first and second participants, wherein each of the one or more meta tags are associated with the second participant and wherein each meta tag is associated with an identified contextual item.

3. The method as recited in claim 1, further including:
capturing, by the computer processor, an audible conversation between first and second participants;
converting, by the computer processor, the audible conversation into computer searchable text data; and
storing, by the computer processor, the searchable text data representative of the audio conversation in an text repository.

4. The method as recited in claim 1, further including storing the audible conversation in an audio repository.

5. The method of claim 1, wherein analyzing the computer searchable data comprises analyzing, by a processor, the computer searchable data during the audible conversation to determine likely existing needs of the second participant.

6. The method as recited in claim 1, further including determining a sentiment toward each of the one or more identified contextual items by detecting one or more words having a sentiment polarity using a sentiment dictionary containing sentiment related words having a particular polarity.

7. The method as recited in claim 6, further including whereby once polarity has been determined, a number of positive and negative sentiment words spoken by the customer in relation to identified contextual items are counted.

8. The method of claim 6, further including displaying to the first participant, a meta tag and the one or more recommendations determined to be relevant to the current conversation between the first participant and the second participant.

9. The method of claim 1, further comprising:
  analyzing, by the processor, the computer searchable data to generate one or more meta tags wherein each meta tag relates to at least a portion of the searchable data and wherein each meta tag is associated with the one or more contextual items; and
  storing the computer searchable data and each said meta tag in the data repository in association with the second participant.

10. The method of claim 9, wherein storing one or more meta tags in a data repository further comprises storing at least a portion of an audible conversation as a voice data with each said meta tag in the data repository in association with the second participant.

11. The method of claim 9, wherein the computer searchable data comprises text data converted from at least a portion of the one or more audible conversations.

12. The method of claim 11, wherein analyzing, by a processor, the stored computer searchable data representing previous audible conversations with the second participant and simultaneously analyzing the computer searchable data converted from the captured current audible conversation comprises searching combined computer searchable data to identify one or more sentiment-related keywords associated with the contextual item.

13. The method of claim 11, wherein analyzing, by a processor, the stored voice data representing previous audible conversations with the second participant and simultaneously analyzing at least a portion of the captured current audible conversation with the second participant includes searching combined voice data to identify the second participant's emotional states associated with the contextual item.

14. A computer system for electronically utilizing content in a current audible conversation between a first participant customer service representative of a company and a second participant company customer, comprising:
  a memory configured to store instructions;
  a processor disposed in communication with said memory, wherein said processor upon execution of the instructions is configured to:
  analyze computer searchable text data, captured, converted and stored by the computer processor during the audible conversation to identify one or more contextual items determined from at least a portion of the current audible conversation between the first and second participants;
  analyze the one or more contextual items to determine one or more future product needs of the second participant also contingent upon analysis of prior stored audible conversations associated with the second participant;
  determine one or more recommendations of product offerings tailored to the second participant based on the determined one or more future product needs of the second participant; and
  generate one or more recommendations of product offerings tailored to the second participant based on the one or more meta tags, wherein the contextual item associated with the meta tag represents one or more topics discussed during one or more communication sessions and each contextual item includes one or more keys.

15. The system as recited in claim 14, wherein the processor is further configured to identify one or more meta tags previously determined relevant to a current conversation between the first and second participants, wherein each of the one or more meta tags are associated with the second participant and wherein each meta tag is associated with an identified contextual item.

16. The system as recited in claim 15, wherein the processor is further configured to:
  capture an audible conversation between first and second participants;
  convert the audible conversation into computer searchable text data; and
  store the searchable text data representative of the audio conversation in an text repository.

17. The system of claim 15, wherein the processor is further configured to display to the first participant, a meta tag and the one or more recommendations determined to be relevant to the current conversation between the first participant and the second participant.

18. The system as recited in claim 15, wherein the processor is further configured to determine a sentiment toward each of the one or more identified contextual items by detecting one or more words having a sentiment polarity using a sentiment dictionary containing sentiment related words having a particular polarity.

19. The system as recited in claim 18, whereby once polarity has been determined, a number of positive and negative sentiment words spoken by the customer in relation to identified contextual items are counted.

20. A method for electronically utilizing content in a current audible conversation between a first participant customer service representative of a company and a second participant company customer, the method comprising the steps of:
  analyzing, by a computer processor, computer searchable text data, captured, converted and stored by the computer processor during the audible conversation to identify one or more contextual items determined from at least a portion of the current audible conversation between the first and second participants;
  analyzing, by the computer processor, the one or more contextual items to determine one or more future product needs of the second participant also contingent upon analysis of prior stored audible conversations associated with the second participant;
  determining, by the computer processor, one or more recommendations of product offerings tailored to the second participant based on the determined one or more future product needs of the second participant;
  analyzing, by the computer processor, the computer searchable data to generate one or more meta tags wherein each meta tag relates to at least a portion of the searchable data and wherein each meta tag is associated with the one or more contextual items; and storing, by the computer processor, the computer searchable data and each said meta tag in the data repository in association with the second participant.

\* \* \* \* \*